(12) United States Patent
Burgess et al.

(10) Patent No.: US 9,897,090 B2
(45) Date of Patent: Feb. 20, 2018

(54) PUMPS

(71) Applicant: Weir Minerals Australia Ltd., Artarmon, New South Wales (AU)

(72) Inventors: Kevin Edward Burgess, Carlingford (AU); Garth Norman Cantrill, Seven Hills (AU)

(73) Assignee: Weir Minerals Australia Ltd. (AU)

( * ) Notice: Subject to any disclaimer, the term of this patent is extended or adjusted under 35 U.S.C. 154(b) by 740 days.

(21) Appl. No.: 14/145,704

(22) Filed: Dec. 31, 2013

(65) Prior Publication Data
US 2014/0112755 A1  Apr. 24, 2014

Related U.S. Application Data

(63) Continuation of application No. 12/451,598, filed on Nov. 19, 2009, now Pat. No. 8,622,706.

(30) Foreign Application Priority Data

May 21, 2007 (AU) ................................ 2007902706
Mar. 7, 2008 (AU) ................................ 2008901109

(51) Int. Cl.
*F04D 7/04* (2006.01)
*F04D 13/08* (2006.01)
(Continued)

(52) U.S. Cl.
CPC ................ *F04D 7/045* (2013.01); *B01F 7/22* (2013.01); *B23P 6/00* (2013.01); *F04D 7/04* (2013.01);
(Continued)

(58) Field of Classification Search
CPC . F04D 7/04; F04D 7/045; F04D 13/08; F04D 29/2288; F04D 29/24;
(Continued)

(56) References Cited

U.S. PATENT DOCUMENTS 2,383,424 A * 8/1945 Stepanoff ................ F04D 1/006
                                                              415/131
3,163,119 A   12/1964 Huppert et al.
(Continued)

FOREIGN PATENT DOCUMENTS

AT          219420      1/1962
AU          636010      3/1993
(Continued)

OTHER PUBLICATIONS

Machine translation of AT 219420 B (Jan. 25, 1962).*
Machine translation of JP 2007023938 A (Feb. 1, 2007) from Espacenet.*

*Primary Examiner* — Jason Shanske
*Assistant Examiner* — Christopher R Legendre
(74) *Attorney, Agent, or Firm* — Morriss O'Bryant Compagni

(57) ABSTRACT

A pump assembly and components therefor including an impeller which has flow inducer elements on an inner surface of a front shroud thereof, a flow directing device or strainer having passageways for delivering material to the impeller and at least one flow circulating passageway and a pump casing having an intake section with flow distribution vanes in the region of a feed opening adjacent the intake section.

21 Claims, 11 Drawing Sheets

(51) Int. Cl.
   *F04D 29/22* (2006.01)
   *F04D 29/24* (2006.01)
   *F04D 29/42* (2006.01)
   *F04D 29/44* (2006.01)
   *F04D 29/70* (2006.01)
   *B01F 7/22* (2006.01)
   *B23P 6/00* (2006.01)
   *B01F 3/00* (2006.01)

(52) U.S. Cl.
   CPC ............ *F04D 13/08* (2013.01); *F04D 29/24* (2013.01); *F04D 29/4273* (2013.01); *F04D 29/4293* (2013.01); *F04D 29/448* (2013.01); *F04D 29/708* (2013.01); B01F 2003/0028 (2013.01); F04D 29/2288 (2013.01); F05D 2250/51 (2013.01); Y10T 29/49238 (2015.01)

(58) Field of Classification Search
   CPC ............ F04D 29/4273; F04D 29/4293; F04D 29/445; F04D 29/447; F04D 29/448; F04D 29/70; F04D 29/708; F04D 13/00; F04D 13/06; B01F 7/16; B01F 7/1625; B01F 7/163; B01F 7/1635; B01F 7/164; B01F 7/1645; B01F 7/183; B01F 7/186; B01F 7/22; B01F 7/225; B01F 2003/0007; B01F 2003/0028; Y10T 29/49236; Y10T 29/49238
   USPC .................. 415/121.1, 121.2, 183, 184, 188; 416/185, 186 R
   See application file for complete search history.

(56) References Cited

U.S. PATENT DOCUMENTS

| | | | |
|---|---|---|---|
| 3,504,986 A | 4/1970 | Jackson | |
| 3,588,280 A | 6/1971 | Shmariahu | |
| 3,597,904 A | 8/1971 | Jakobsson et al. | |
| 3,741,531 A | 6/1973 | Chaplygin et al. | |
| 3,904,306 A | 9/1975 | Navelsaker | |
| 3,918,841 A | 11/1975 | Kida et al. | |
| 4,045,522 A * | 8/1977 | Nafziger ................ | F04D 7/045 261/93 |
| 4,120,603 A | 10/1978 | Downing | |
| 4,145,008 A | 3/1979 | Wolford | |
| 4,269,564 A | 5/1981 | Naffziger | |
| 4,275,988 A | 6/1981 | Kalashnikov et al. | |
| 4,355,954 A | 10/1982 | Wilson | |
| 4,435,122 A | 3/1984 | Niskanen et al. | |
| 4,435,193 A | 3/1984 | Gullichsen et al. | |
| 4,456,424 A | 6/1984 | Araoka | |
| 4,460,181 A | 7/1984 | Araoka | |
| 4,596,510 A | 6/1986 | Arneth et al. | |
| 4,604,035 A | 8/1986 | Roberts | |
| 4,643,639 A * | 2/1987 | Caine ................ | F04D 29/468 277/412 |
| 4,650,342 A | 3/1987 | Goodwin | |
| 4,664,592 A * | 5/1987 | Grzina ................ | F04D 29/2266 415/171.1 |
| 4,675,033 A | 6/1987 | Fellman et al. | |
| 4,728,256 A | 3/1988 | Araoka | |
| 4,854,820 A | 8/1989 | Zolotar et al. | |
| 4,917,577 A * | 4/1990 | Stirling ............... | B01F 3/04617 261/93 |
| 4,921,400 A | 5/1990 | Niskanen | |
| 5,005,364 A * | 4/1991 | Nelson ...................... | F25C 5/16 366/165.3 |
| 5,076,757 A | 12/1991 | Dorsch | |
| 5,137,424 A | 8/1992 | Daniel | |
| 5,141,392 A | 8/1992 | Uvemo | |
| 5,238,363 A | 8/1993 | Thielke et al. | |
| 5,281,088 A | 1/1994 | Brandt | |
| 6,468,039 B1 | 10/2002 | Lehman | |
| 6,533,543 B2 * | 3/2003 | Tagomori ............ | F04D 29/4273 415/151 |
| 6,619,910 B1 | 9/2003 | Burgess | |
| 6,698,916 B2 | 3/2004 | Araoka | |
| 6,820,333 B2 | 11/2004 | Shimmei et al. | |
| 6,843,003 B2 | 1/2005 | Araoka | |
| 6,953,321 B2 | 10/2005 | Roudnev et al. | |
| 7,121,794 B2 * | 10/2006 | Borrowman ............... | F03B 3/02 29/401.1 |
| 7,207,767 B2 | 4/2007 | Ashihara et al. | |
| 7,273,352 B2 | 9/2007 | Williams et al. | |
| D586,825 S | 2/2009 | Cantrill et al. | |
| D586,826 S | 2/2009 | Cantrill et al. | |
| 8,622,706 B2 * | 1/2014 | Burgess ..................... | F04D 7/04 416/185 |
| 2004/0136825 A1 | 7/2004 | Addie et al. | |
| 2004/0197215 A1 | 10/2004 | Shimmei et al. | |
| 2005/0152779 A1 * | 7/2005 | Williams ............ | F04D 29/2294 415/206 |
| 2007/0086888 A1 | 4/2007 | Patel et al. | |
| 2007/0154304 A1 * | 7/2007 | Abdallah ................ | F04D 17/12 415/199.1 |
| 2010/0135765 A1 * | 6/2010 | Burgess ..................... | F04D 7/04 415/1 |
| 2014/0112755 A1 * | 4/2014 | Burgess ..................... | F04D 7/04 415/1 |

FOREIGN PATENT DOCUMENTS

| | | | |
|---|---|---|---|
| CH | 258098 A | 11/1948 | |
| CN | 2340953 Y | 9/1999 | |
| CN | 2818864 Y | 9/2006 | |
| CN | 2846821 Y | 12/2006 | |
| DE | 2545736 | 4/1977 | |
| DE | 4428748 A1 * | 2/1996 | ............ B63H 11/08 |
| EP | 1270952 A2 | 1/2003 | |
| FR | 2082745 A5 * | 12/1971 | ............... B01F 5/16 |
| GB | 802161 A * | 10/1958 | ............... F04D 7/04 |
| GB | 2070687 A | 9/1981 | |
| JP | 03115795 A | 5/1991 | |
| JP | 10009183 | 1/1998 | |
| JP | 03060079 B2 | 7/2000 | |
| JP | 2002115696 A | 4/2002 | |
| JP | 2002155898 A | 5/2002 | |
| JP | 2005273621 | 10/2005 | |
| JP | 2006090134 | 4/2006 | |
| JP | 2006118407 | 5/2006 | |
| JP | 2007023938 A | 2/2007 | |
| WO | 86/03809 A1 | 7/1986 | |
| WO | 9747889 | 12/1997 | |

* cited by examiner

*(PRIOR ART)*

PUMPS

CROSS-REFERENCES TO RELATED APPLICATIONS

This is a continuation application claiming priority to non-provisional U.S. Ser. No. 12/451,598, now issued as U.S. Pat. No. 8,622,706, which claims priority to International Application No. PCT/AU2008/000708, filed May 20, 2008, which claims priority to Australian Application No. 2007902706, filed May 21, 2007, and to Australian Application No. 2008901109, filed Mar. 7, 2008, the entire contents of each of which are incorporated herein by reference.

TECHNICAL FIELD

This invention relates generally to pumps and more particularly to pumps of the type which include for example sump pumps, submersible pumps, jet pumps and the like.

BACKGROUND ART

Centrifugal sump pumps find application in a wide range of industries including mining. Mining applications for sump pumps typically include pumping a mixture of water with mineral particles of different particle sizes and densities. This mixture is commonly referred to as slurry and because it contains solids it can be very abrasive. Consequently sump pumps used in mining in most instances are constructed from wear resistant materials.

Sump pumps used in mining applications are typically mounted on beams on top of a usually wide and relative shallow sump or pit. A driving motor and pump bearings are all disposed above floor level so they are not submerged thereby ensuring longer life of these parts. The pumping elements are attached to a vertical shaft and are normally positioned at the end of a long cantilevered shaft and near to or close to the bottom of the sump. The sumps are normally located strategically within the plant and sunk below the normal floor level with shallow angled surrounding floor areas so that all leakage, spillage or slurry products will gravitate directly into the sump. Depending on the size of the sump in relation to the sump pump, the type of particles and their density and the flow rate of slurry required from the sump, some percentage of particles will naturally collect in the bottom of the sump and, once settled out of the water, they tend not be picked up again by the sump pump. Over time these particles build-up and can block the sump, particularly if the particles tend to bind together.

A conventional sump pump apparatus is illustrated in FIG. 1 which is a schematic sectional side elevation thereof. The sump pump 10 as shown includes a pump casing 12 with an impeller 14 disposed therein. The impeller 14 is operatively connected to a drive shaft 16 which in the normal pump operating position is generally vertically arranged. The drive shaft 16 is supported by a bearing assembly 18 and is operatively connected to a driving motor (not shown). A column 20 surrounds the drive shaft 16.

The pump casing 12 has two inlets to a pump chamber 21 within the casing, namely a first inlet 22 and a second inlet 24. A first strainer 26 is provided at the first inlet 22 and a second strainer 28 at the second inlet 24. A discharge pipe 25 extends from the pump casing 12. When in use the first inlet 22 and strainer 26 is positioned close to the bottom of the sump with the second inlet 24 located above it. The strainers 26, 28 function to prevent the ingress of large particulate matter into direct contact with the impeller 14 which is housed in the casing 12. Such particulates can jam the rotation of the impeller and possibly damage the impeller, leading to an early failure of the sump pump. However the impeller can still become damaged by a build-up of finer particulates within the casing.

In order to try and alleviate the problems of particle build up both in the sump pit and within the conventional sump pump housing as referred to above, it has been proposed to provide agitators which somehow extend separately into the sump pit, or another coaxial type of agitator which can be fitted to an extension shaft which projects below the second inlet 24. However the effectiveness of known agitators can vary considerably and, because agitators tend to wear rapidly, their efficiency can be rapidly diminished during use. In some circumstances, trials have been made in which the lower sump pump inlet 22 is completely closed off, with the slurry only entering via the upper pump inlet 24. While this may prevent jamming the rotation of the impeller, this may also limit the flow that can be pumped, which in turn may result in sump overflow.

SUMMARY OF THE INVENTION

In a first aspect the present invention provides a pump impeller having a rotational axis and including:
  a hub,
  a back shroud extending from the hub, and
  a front shroud,
  wherein each of the shrouds has an inner surface and an outer surface, the impeller also having:
    a plurality of pumping vanes extending between the respective inner surfaces of the shrouds, and
    an impeller inlet opening in the front shroud coaxial with the rotation axis of the impeller,
  wherein the impeller includes one or more inducer elements which extend from the inner surface of the front shroud towards the rotation axis and which are positioned adjacent the impeller inlet opening.

During use of such an impeller, when the impeller is caused to rotate the inducer elements can assist the uplift of particulate matter into the region of the pumping vanes and thus the subsequent removal of the matter from adjacent the impeller inlet opening. In situations such as clearing settled solids from a sump pit, the particles may be relatively large in size or naturally heavy or dense, and the inducer elements can assist with the removal of such settled material.

In one embodiment the impeller can include a plurality of inducer elements, the said elements are arranged circumferentially about the impeller inlet opening. In other forms there may be only one inducer element, for example a screw-form or helix shaped protrusion on the inside surface of the impeller front shroud.

In one embodiment a plurality of flow generating elements can be arranged in a spaced apart fashion and extending from the outer surface of the front shroud in the region of the impeller opening. The arrangement is such that in use the flow generating elements are adapted to cause a recirculating flow in the region of the pump inlet and externally thereof.

In one embodiment the front shroud can include an annular wall portion and a projecting wall portion depending therefrom, the projecting wall portion arranged to extend away from the pumping vanes to terminate at a free end, the impeller inlet opening being in the region of the free end so as to define an impeller intake region between the impeller inlet opening and the pumping vanes.

In one embodiment the projecting wall portion can taper inwardly from the annular wall portion when moving in a direction towards the free end. In one form of this, the projecting wall portion may be curved.

In one embodiment the impeller can also have a further group of pumping vanes on the outer surface of the back shroud arranged in spaced relation from one another. In one form of this, each further pumping vane can be curved with one end adjacent the back shroud outer peripheral edge and extending inwardly therefrom towards the hub.

In one embodiment of the impeller, in situations where there are a plurality of inducer elements, the said elements can be in the form of vanes. In one form the vanes can be generally of an aerofoil shape. In one arrangement, the vanes can be located on the inner surface of the projecting wall portion adjacent the free end.

In one embodiment of the impeller, in situations where there is a plurality of flow generating elements, the said elements can also in the form of vanes. In one form these vanes can also generally be of an aerofoil shape. In one arrangement, these vanes can be located on the outer surface of the projecting wall portion adjacent the free end.

The inducer elements are arranged such that in use, when the impeller is rotating they assist in creating a swirling flow adjacent to and externally of the impeller inlet. In one embodiment the inducer elements are in the form of vanes extending from the inner surface of the front shroud, each having free edge portion which is spaced from the central rotation axis. In one arrangement of this, each vane extends towards the rotation axis to a point about half the radius of the impeller opening. The inducer vanes may be of any suitable shape and not necessarily aerofoil-shaped. The vanes may extend generally radially or may be inclined to the normal radial direction. Any suitable number of inducer elements may be provided, and in one embodiment two are arranged in diametric opposed position at the impeller flow intake region.

In a second aspect the present invention provides a flow directing device, in use for directing material in relation to an adjacent moving impeller, the device including a main body having an inner side and an outer side, a plurality of passageways extending between the inner side and the outer side of the main body, at least one passageway providing for the in use delivery of material to an opening of the impeller and at least one other passageway providing for the in use circulation of a flow of material past the impeller.

In response to the in use rotation of the adjacent impeller, such a device can create a recirculation flow pattern of slurry material aimed to cause the disturbance of settled particulate matter in the region of the impeller, which can be important for clearing settled solids from a sump pit when the particles may be large in size or naturally heavy or dense. Once the settled solid material is disturbed, the flow directing device also has a separate passageway which leads to the opening of the impeller where the pumping action draws the fluidised slurry material into the impeller for removal. The device therefore performs a dual function and is ideally suited to pumping applications in areas where solids may have been allowed to settle for some time.

In one form, the flow directing device can include a chamber adjacent the inner side of the main body, said passageways communicating with said chamber. In one form the device can include a plurality of said delivery passageways and a plurality of said circulation passageways.

In one embodiment, a plurality of said passageways can be generally annular in shape when viewed in a horizontal cross-section and arranged substantially concentrically with respect to one another. In one form of this, the or each circulation passageway may be disposed radially outwardly with respect to the or each delivery passageway.

In one embodiment of the flow directing device, the main body includes a peripheral side wall section and a plurality of concentrically arranged ring shaped elements operatively connected together and operatively connected to the peripheral side wall section, the annular spaces between the ring shaped elements providing for said passageways. In one form of this, one of said ring shaped elements can include a skirt portion at the outer side of the main body which provides for a partial barrier between the circulation passageway(s) and the delivery passageway(s).

In a third aspect the present invention provides a flow directing device which is arranged to direct two material flows in response to the relative movement of an adjacent impeller, the flows being:
 a mixing flow in which material is mixed and agitated in response to the movement of the adjacent impeller in use; and
 a pumping flow in which material is passed through the adjacent impeller in use and pumped to another location.

Such a device has operational advantages as have already been described herein for the device of the second aspect.

In a fourth aspect the present invention provides a pump casing including:
 a main body section having a pumping chamber therein, and a discharge outlet extending from the pumping chamber;
 a strainer section having an intake region therein, with one or more inlets located at the intake region; and
 a feed opening between the intake region and the pumping chamber;
 wherein a plurality of flow distribution vanes are positioned in the region of the feed opening.

In response to the in use rotation of the adjacent impeller, the flow distribution vane(s) in the pump casing can assist with the efficient delivery of slurry material into the pumping chamber, where the pumping action draws the fluidised slurry material into the impeller for removal. The vane(s) can reduce swirl and improve the efficiency of delivery of the slurry flow to the in use outer surface of the back shroud of the impeller.

In one embodiment having a plurality of inlets, said flow distribution vanes can extend from the inlets and be arranged in spaced-apart relation.

In one embodiment the main body section can include a back wall and a peripheral side wall depending from said back wall, wherein the intake region extends from said back wall in a direction opposite to the peripheral side wall.

In one embodiment, the intake region can include a generally frusto-conical inner side surface, having said inlets being disposed in spaced apart relation around said frusto-conical section.

In one embodiment, the inlets can be elongate holes or slots arranged in the inner side surface of the intake region.

In one embodiment of the pump casing, the pumping chamber can be generally volute in configuration.

In a fifth aspect the present invention provides a pump impeller having a rotational axis and including:
 a hub,
 a back shroud extending from the hub, and
 a front shroud,
 wherein each of the shrouds has an inner surface and an outer surface, the impeller also having:

a plurality of pumping vanes extending between the respective inner surfaces of the shrouds, and an impeller inlet opening in the front shroud coaxial with the rotation axis of the impeller, wherein the impeller includes one or more flow generating elements which extend from the outer surface of the front shroud in the region of the impeller opening.

In one embodiment, the pump impeller of the fifth aspect can be otherwise as claimed in the first aspect.

In a sixth aspect the present invention provides a pump assembly including:

a pump impeller according to either the first or fifth aspects;

a flow directing device according to the second or third aspects; and a pump casing according to the fourth aspect, said impeller being mounted for rotation within said pumping chamber of said main body section of said pump casing, said flow directing device being operatively secured to said pump casing.

In a seventh aspect the present invention provides a method of pumping a flow of a slurry material, the method comprising the steps of:

operatively coupling (i) an impeller having one or more inducer elements that are positioned adjacent to the impeller inlet opening onto (ii) a flow directing device which has a passageway for providing the in use delivery of material to the opening; and actuating the rotation of the impeller relative to the flow directing device.

In an eighth aspect, the present invention provides a method of causing mixing and agitation of a slurry material, as well as pumping of a flow of the slurry material, the method comprising the steps of:

operatively coupling (i) an impeller having one or more inducer elements that are positioned adjacent to the impeller inlet opening and one or more flow generating elements that are positioned to extend from a shroud of the impeller onto (ii) a flow directing device which has at least one passageway for the in use circulation of a flow of slurry material past the impeller so as to cause mixing and agitation of the slurry material, and a passageway for providing the in use delivery of material to the inlet opening; and actuating the rotation of the impeller relative to the flow directing device.

In a ninth aspect the present invention provides a method of causing mixing and agitation of a slurry material, as well as pumping of a flow of the slurry material, the method comprising the steps of:

operatively coupling an impeller in accordance with the first or fifth aspects with a flow directing device in accordance with either the second or third aspects; and actuating the rotation of the impeller relative to the flow directing device.

In a tenth aspect the present invention provides a method of replacing an impeller in a pump assembly according to the sixth aspect, the method including the steps of removing the flow directing device to thereby provide access to the pumping chamber, removing the impeller from the pumping chamber and replacing it with another impeller and resecuring the or another flow directing device to the pump casing.

In an eleventh aspect the present invention provides a method of assembling a pump assembly according to the sixth aspect, the method including mounting the impeller within the pumping chamber and operatively securing the flow directing device to the pump casing.

BRIEF DESCRIPTION OF THE DRAWINGS

Notwithstanding any other forms which may fall within the scope of the apparatus, and method as set forth in the Summary, specific embodiments of the method and apparatus will now be described, by way of example, and with reference to the accompanying drawings in which.

DETAILED DESCRIPTION OF SPECIFIC EMBODIMENTS

Figure 2:
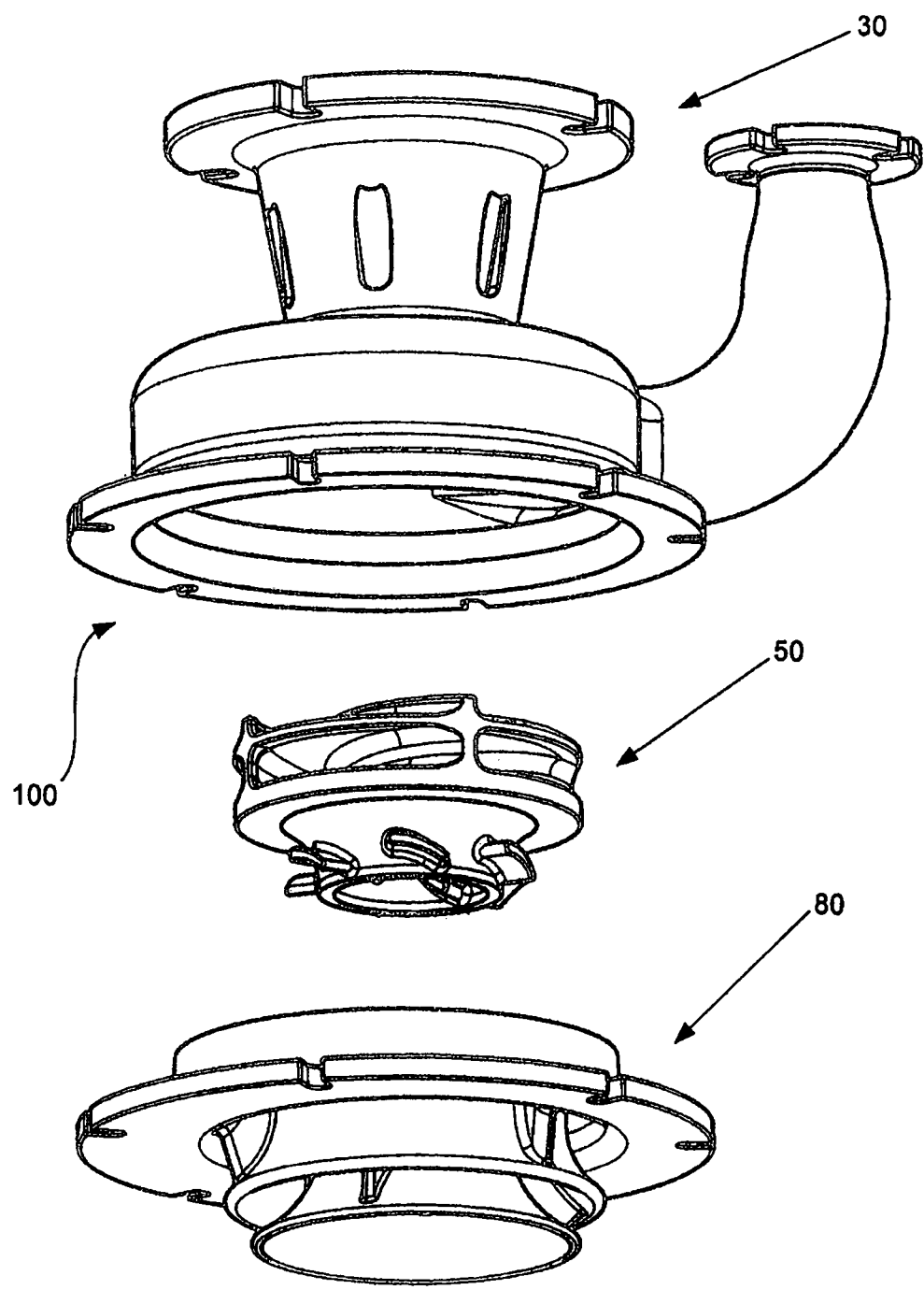
FIG. 2 is an exploded view of a pump assembly according to one embodiment of the present invention.
Figure 3:
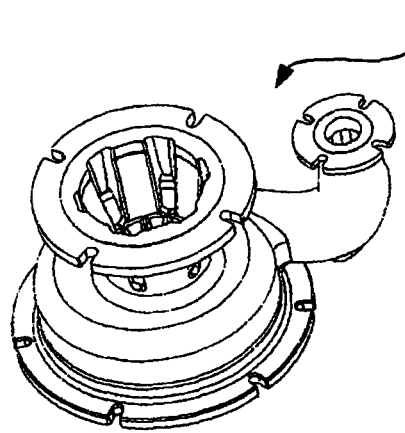
FIG. 3 is an isometric view of a pump casing for a pump assembly according to the present invention viewed from an in use upper side.
Figure 4:
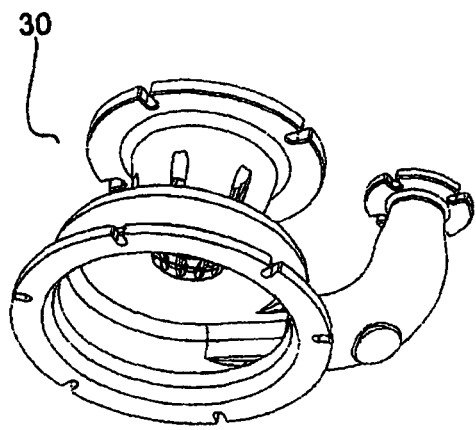
FIG. 4 is an isometric view of the pump casing shown in FIG. 3 viewed from an in use lower side.
Figure 5:
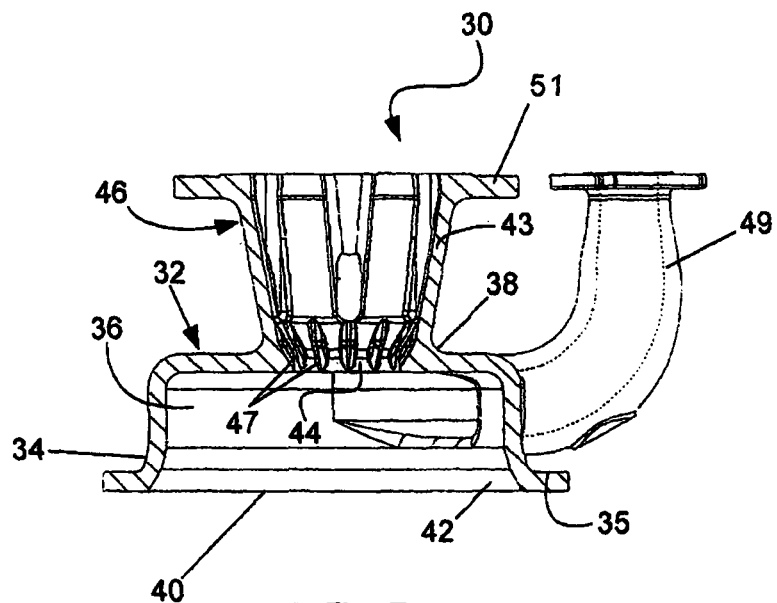
FIG. 5 is a first part sectional view of the pump casing shown in FIGS. 3 and 4.

Referring now to the drawings, in FIG. 2 a pump assembly 100 is shown which comprises a pump casing 30, an impeller 50 and a flow directing device 80. The impeller 50 is disposed within the pump casing 30 and the flow directing device 80 mounted to the pump casing to enclose the impeller 50 therebetween when the three components are assembled together. In one normal mode of operation the impeller 50 is mounted for rotation about a substantially vertical axis, and the flow directing device 80 is disposed below the pump casing 30.

As shown in FIGS. 3 to 8 the pump casing 30 includes a pump body section 32 having a pumping chamber 36 therein which is adapted to receive the impeller 50. The pump body section 32 includes a peripheral side wall 34, a back wall 38 and an open front side 42. A peripheral mounting flange 35 surrounds the open front side 42. The central axis of flange 35 is axially offset with respect to the central axis of second inlet 44. The open front side 42 provides for a first inlet 40 to the pumping chamber 36. A discharge pipe 49 extends from the peripheral side wall 34 and is in fluid communication with the pumping chamber 36. The pumping chamber 36 is of a volute shape.

Figure 1:
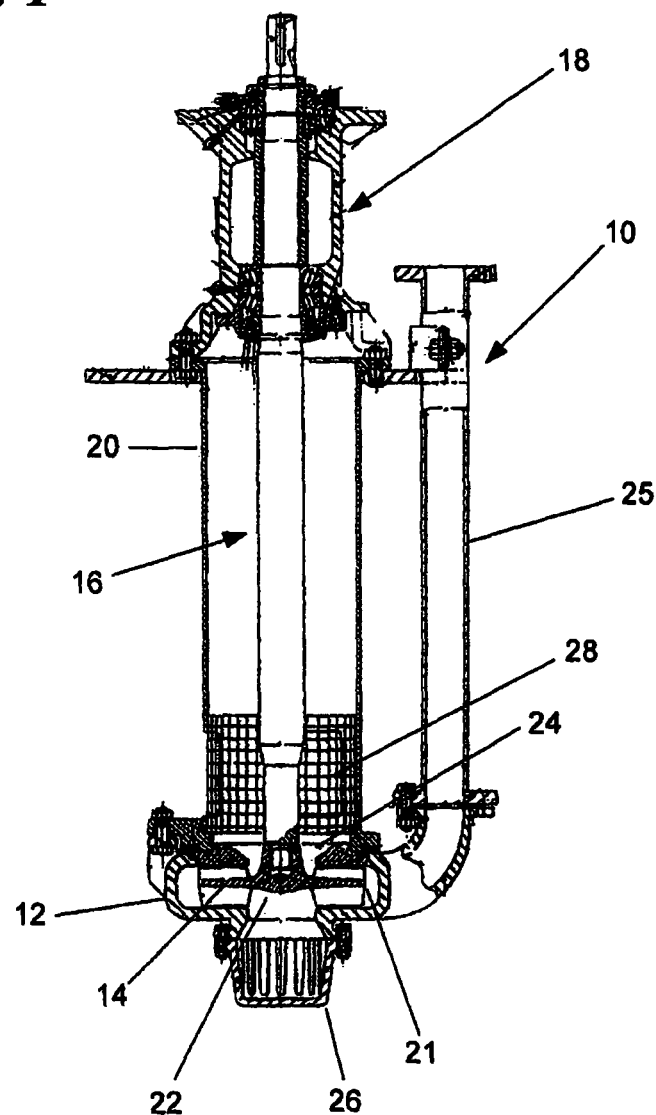
FIG. 1 is a schematic sectional side elevation of a typical submersible pump apparatus with which the various components of the present invention are suitable for use.
Figure 6:
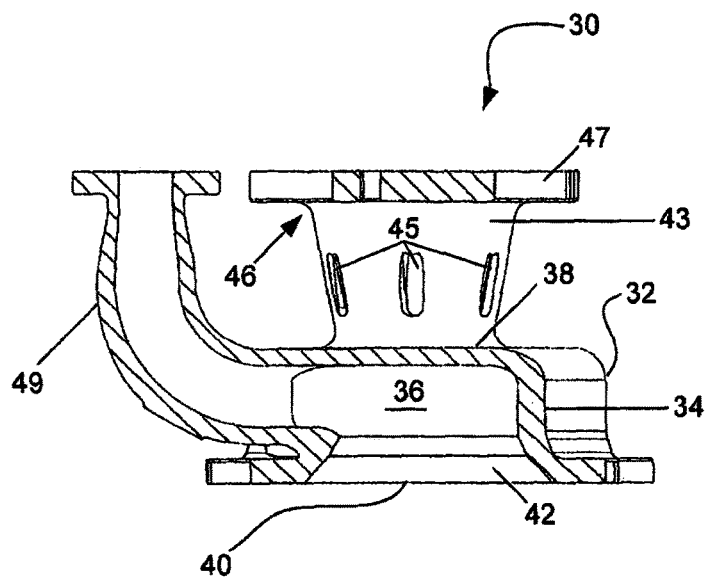
FIG. 6 is a second part sectional view of the pump casing shown in FIGS. 3 to 5.
Figure 7:
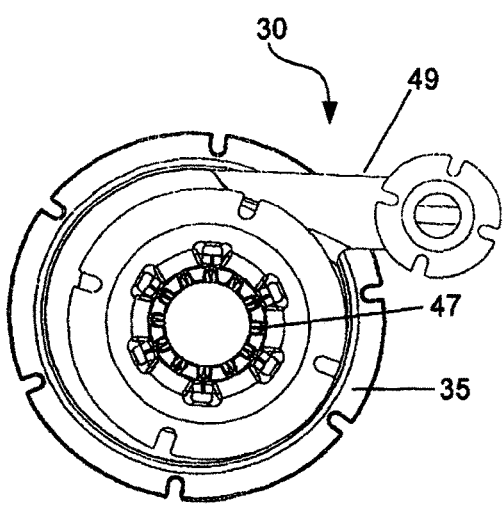
FIG. 7 is an in use top plan view of the pump casing shown in FIGS. 3 to 6.
Figure 8:
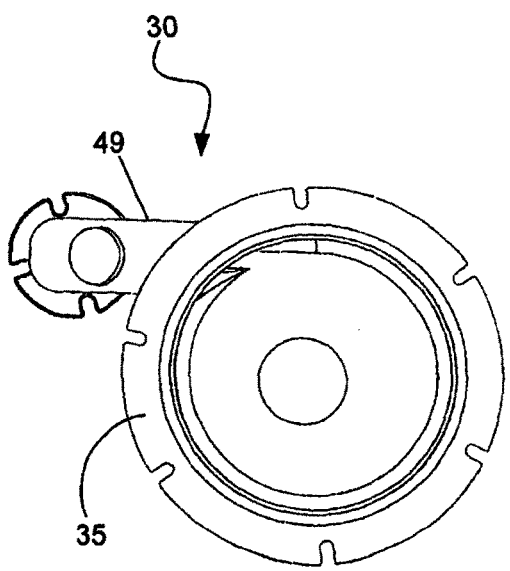
FIG. 8 is an in use underside plan view of the pump casing shown in FIG. 3 to 7.
Figures 9, 10, 11:
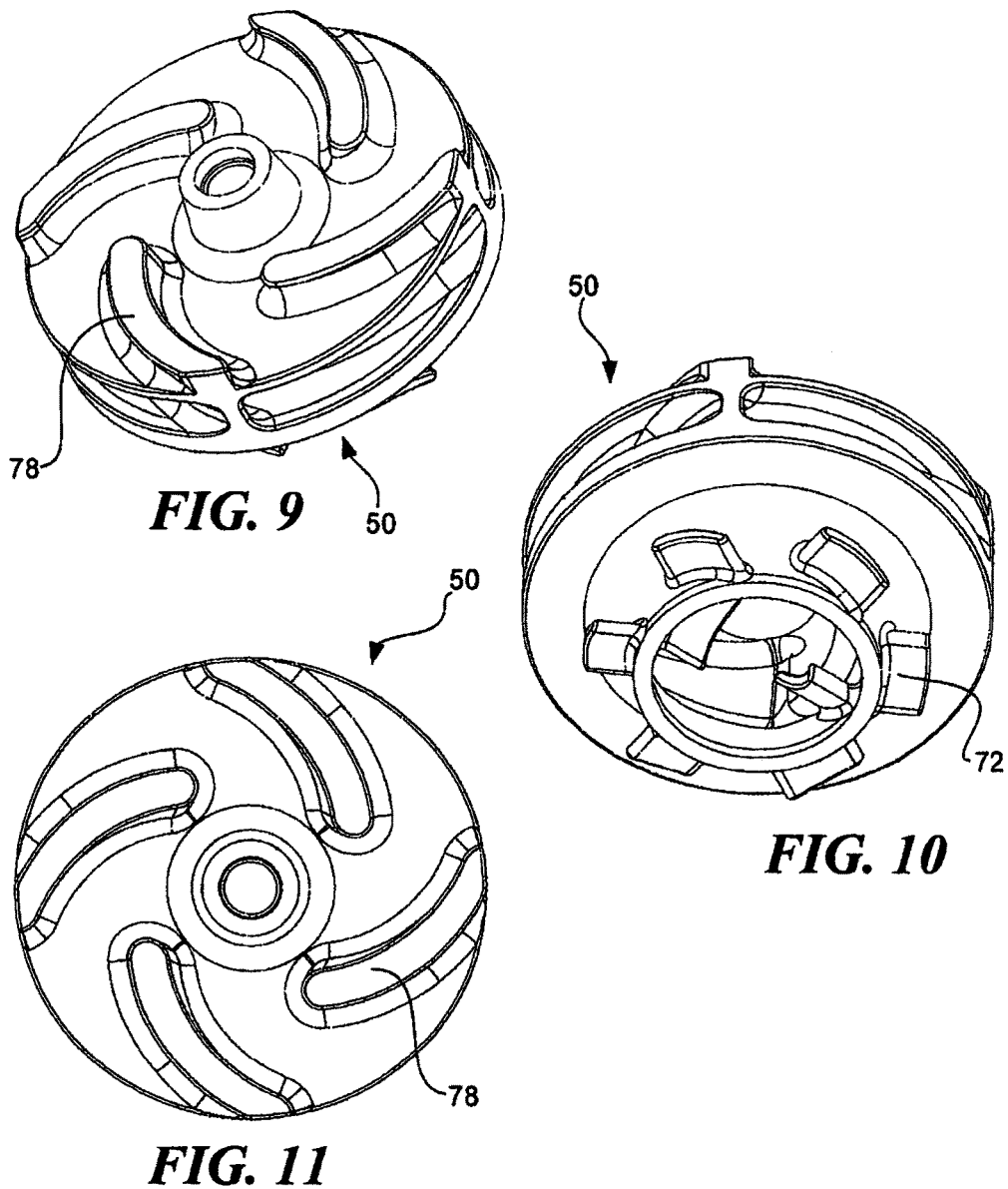
FIG. 9 is an isometric view of an impeller for a pump assembly according to the present invention viewed from an in use upper side.
FIG. 10 is an isometric view of the impeller shown in FIG. 9 viewed from an in use lower side.
FIG. 11 is an in use top plan view of the impeller shown in FIGS. 9 and 10.
Figure 12:
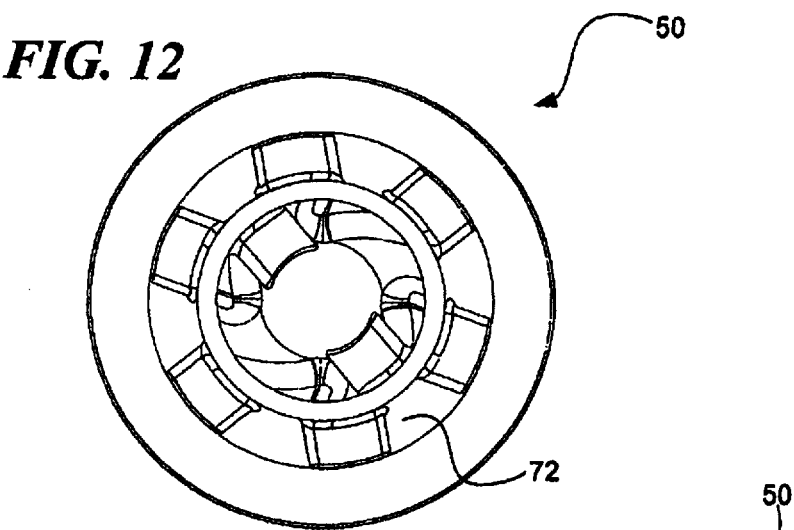
FIG. 12 is an in use underside plan view of the impeller shown in FIGS. 9 to 11.
Figure 13:
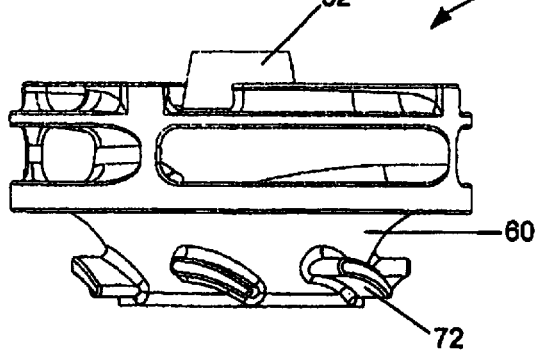
FIG. 13 is a side elevation of the impeller shown in FIGS. 9 to 12.

The pump casing 30 further includes a strainer section 46 which extends from the back wall 38 of the pump body section 32. The strainer section 46 and the pump body section 32 are an integral unit which may be cast or otherwise suitably formed. By manufacturing the strainer section of wear resistant material (as is the pump body section 32), the life of the product can be extended compared with the prior art apparatus (refer to FIG. 1) in which the strainer section is made of a mesh material which can become rapidly worn. The strainer section 46 is hollow and has a generally frusto-conical side wall 43 tapering inwardly towards the back wall 38 of the pump body section 32. A mounting flange 51 is provided at the end of the strainer section 46 remote from pump body section 32. A second inlet 44 provides for fluid communication between the pumping chamber 36 and the interior of the strainer section 46. As shown in FIG. 6, six elongate feed aperture slots 45 are arranged in the side wall 43 of the strainer section 46, the apertures 45 being in spaced apart relation around the side wall 43. A plurality of flow distribution vanes in the form of twelve vertically-aligned, elongate protrusions 47 are provided in the region of inlet 44. These protrusions 47 assist the even flow of slurry material and reduce swirl in flow from the strainer section 46 into the pumping chamber 36 via the inlet 44.

In further embodiments of the pump casing, a different shape of strainer section other than frusto-conical can be envisaged, as well as a different shape of the pump body section 32, for example dome-like rather than the generally flat-topped form 32, 34 shown in the drawings.

Figure 14:
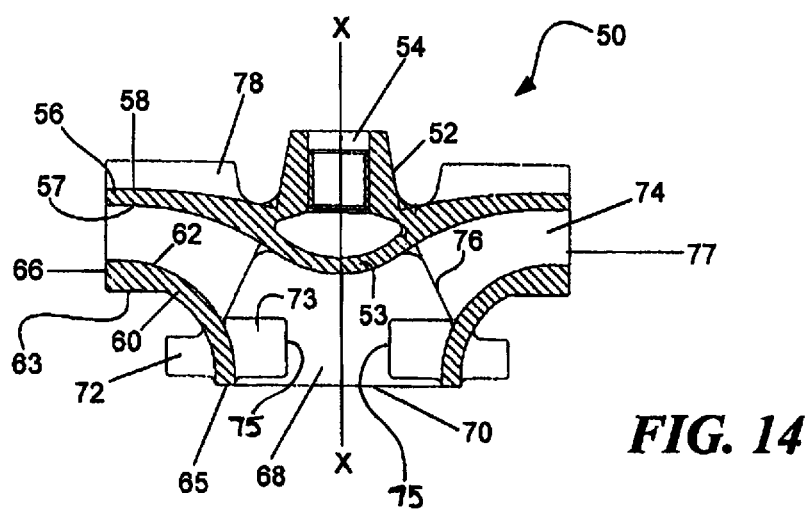
FIG. 14 is a sectional side elevation of the impeller shown in FIGS. 9 to 13.
Figure 15:
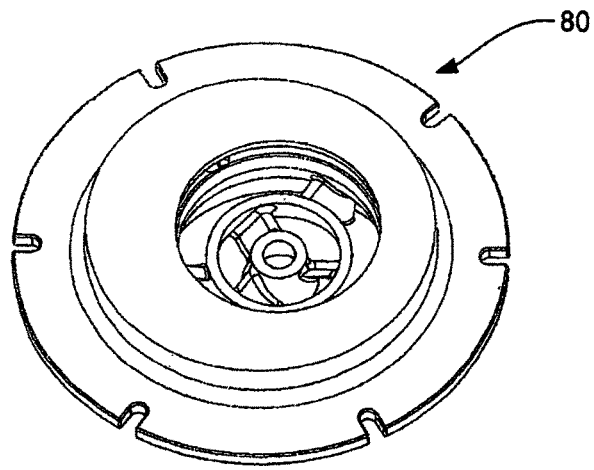
FIG. 15 is an isometric view of a flow directing device for a pump assembly according to the invention viewed from an in use upper side.
Figure 16:
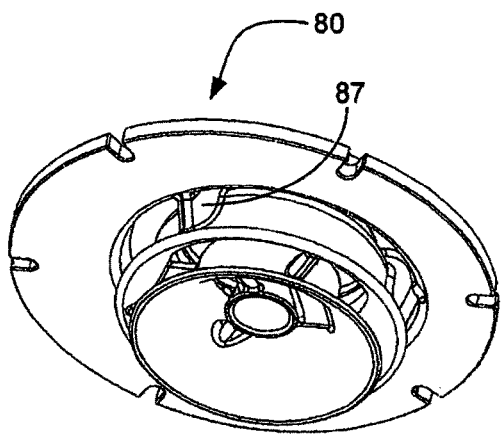
FIG. 16 is an isometric view of the device shown in FIG. 15 viewed from an in use lower side.
Figure 17:
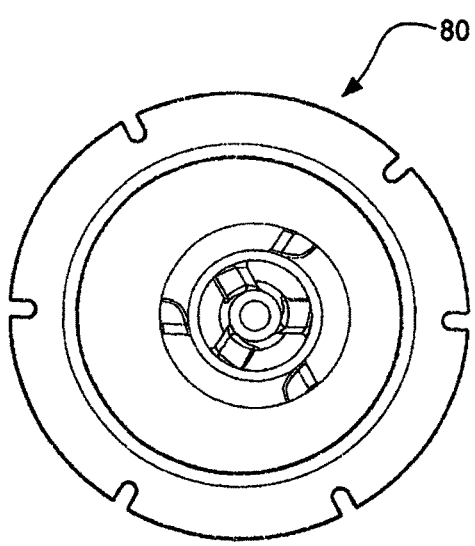
FIG. 17 is an in use top plan view of the device shown in FIGS. 15 and 16.
Figure 18:
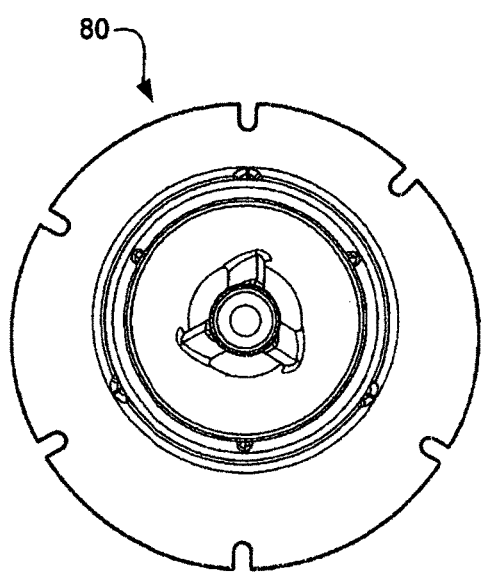
FIG. 18 is an in use underside plan view of the device shown in FIGS. 15 to 17.

Referring now in particular to FIGS. 9 to 14 there is illustrated an impeller 50 which, as is best illustrated in FIG. 14, comprises a hub 52 having a mounting 54 for a drive shaft (not shown) and an eye 53. The impeller 50 is rotatable about the axis of rotation X-X. The impeller further includes a back shroud 56 extending from the eye 53 of the hub 52 the back shroud having an inner face 57 and an outer face 58. The impeller further includes a front shroud 60 with an impeller opening 70 extending therethrough. A plurality of pumping vanes 74 extend between the shrouds 56 and 60, each vane having an inner leading edge portion 76 and a trailing outer edge portion 77. The front shroud has an inner surface 62 and an outer surface 63. As shown, the front shroud 60 is generally curved in shape to define a projecting wall portion which extends away from the pumping vanes 74 and which tapers in an inwardly curved manner. The portion of the front shroud 60 which is adjacent to the impeller opening 70 is generally coaxial with respect to the rotation axis X-X. The shroud 60 has an inner edge 65 and an outer edge 66, the impeller inlet opening 70 being at the inner edge 65. In the space between the shrouds 56, 60 is a flow intake region 68 which is located between the inner edge of the front shroud 65 and the inner edge of the vanes 74.

The impeller also includes four further pumping vanes 78 extending from the outer face 58 of back shroud 56. These pumping vanes 78 are generally curved and arranged with one end being adjacent to the outer peripheral edge portion 77 of the back shroud 56, and the other end being adjacent to the hub 52. In use a material slurry which is drawn into the pump in the region of the back shroud 56 by the rotation of the impeller 50 is pumped via these pumping vanes 78.

The impeller 50 further includes two flow inducer elements disposed circumferentially within the flow intake region 68. The inducer elements are in the form of inducer vanes 73 which are located on the inner face 57 of the front shroud and which have a free edge portion 75 that extends toward the axis of rotation X-X. These inducer vanes 73 help create a swirling flow which, in the application of a sump pump, extends from the impeller inlet towards the bottom of the sump or pit to assist the particles to be uplifted and entrained in the flow and to enter the pump impeller 50. The number, size, shape and proportion of the vanes can vary beyond the arrangement shown in FIGS. 9 to 14 in which two vanes are shown of aerofoil cross section, angled relative to the flow into the intake, positioned diametrically opposite one another at the impeller opening 70 and extending towards the inlet centreline by approximately 50% of the radius. The number and shape of the inducer vanes, and the angle and distance of each relative to the centreline can be varied to optimise the inflow to suit specific pumping needs.

The impeller 50 further includes a plurality of flow generating vanes 72 extending from the outer surface of the front shroud. As illustrated six vanes are shown around the outer surface of the front shroud. These flow generating vanes 72 help create a recirculating flow in the region of the pump inlet, aimed to cause a disturbance of any settled particulate matter in the region of the impeller which, in the application of a sump pump, can be in the bottom of the sump or pit to assist the particles to be entrained in the flow. The number, size, shape and proportion of the vanes can vary beyond the arrangement shown in FIGS. 9 to 14 in which six vanes are shown of aerofoil cross section, each aerofoil being angled relative to the flow into the intake region 68.

Figure 19:
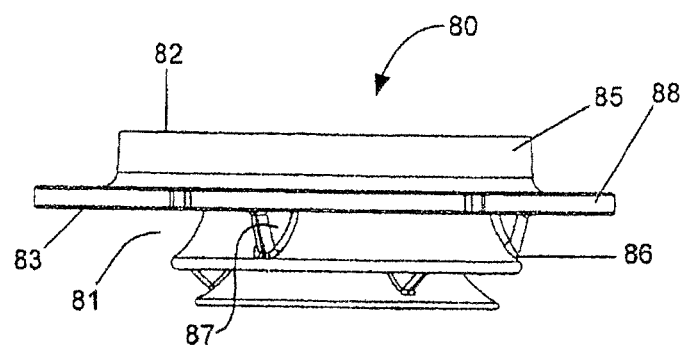
FIG. 19 is a side elevation of the device shown in FIGS. 15 to 18.
Figure 20:
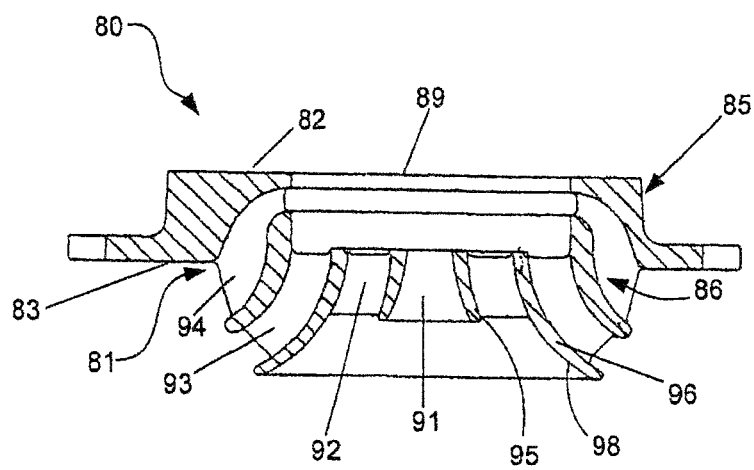
FIG. 20 is a sectional side elevation of the device shown in FIGS. 15 to 19.

Referring in particular to FIGS. 15 to 20, a flow directing device 80 is shown which, as best illustrated in FIGS. 19 and 20, comprises a main body 81 which is comprised of an outer peripheral wall section 85 and an inner section 86. The outer wall section 85 and inner wall section 86 are interconnected by a series of flanges 87. The main body 81 has an inner side 82 and an outer side 83. The outer peripheral wall section 85 is generally circular when viewed in plan and has an annular mounting flange 88 at one side thereof. A chamber 89 is provided adjacent the inner side 82 and is in communication with concentrically arranged delivery passageways 91 and 92 and formed by ring shaped elements 95 and 96. Passageway 92 is generally annular in shape about inner passageway 91. The ring shaped elements 95 are connected together by flanges. The passageways are generally annular in shape when viewed in horizontal cross-section and arranged substantially concentrically with respect to one another.

The device 80 further includes annular flow circulating passageways 93 and 94 which provides for flow circulation between the inner and outer sides of the main body 81. The passageways are generally concentric with one another, and the ends thereof being adjacent the inner side of the main body 81. The ring shaped element 96 has a skirt portion 98 which extends beyond the other elements and aids as a partial barrier between the delivery passageways 91 and 92 and the flow circulating passageways 93 and 94.

In response to the in use rotation of the adjacent impeller 50, such a device 80 can create a recirculation flow pattern of slurry material aimed to cause the disturbance of settled particulate matter in the region of the impeller, which can be important for clearing settled solids from a sump pit when the particles may be large in size or naturally heavy or dense. Slurry material can be cycled through flow passageways 93, 94 to effect dispersal of settled particles. Once the settled solid material is disturbed, the flow directing device 80 also has concentrically arranged delivery passageways 91 and 92 which lead to the impeller. Rotation of the impeller 50 causes a pumping action which draws the fluidised slurry material into the impeller 50 for removal. The device 80 therefore performs a dual function and is ideally suited to pumping applications in areas where solids may have been allowed to settle for some time.

Figure 21:
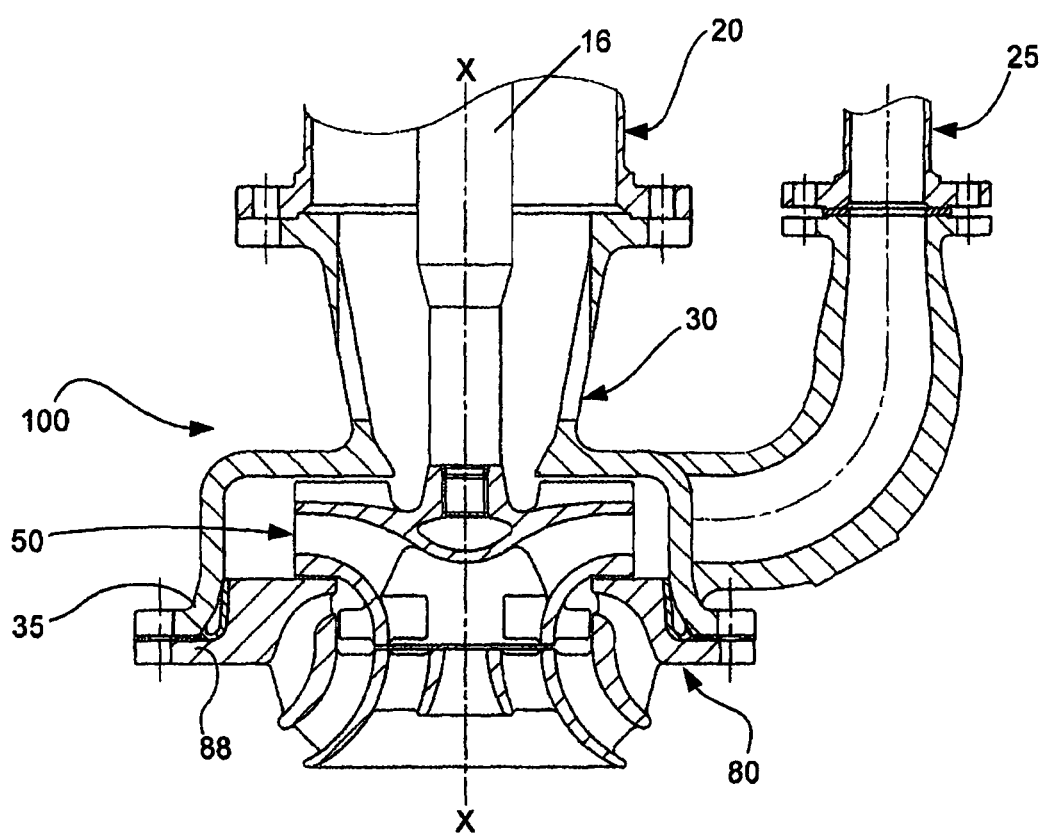
FIG. 21 is a sectional side elevation of a pump assembly according to the invention when in an assembled position.

As best illustrated in FIG. 21 which shows the pump assembly 100 in its installed position, the axis X-X which is the axis of rotation of the impeller 50 is axially offset with respect to the central axis of the flange 35 on pump casing 30 and flange 88 on flow directing device 80. A circular, compressible rubber seal can be incorporated between the flanges on the pump casing 30 and the device 80. The arrangement of the flanges ensures that the device 80 can only fit in one orientation with respect to the casing 30.

In the assembled position shown in FIG. 21, the front shroud 60 of the impeller 50 is partially disposed within chamber 89 of the flow directing device 80 with the flow inducer elements 73 being adjacent and in fluid communication with passageways 91 and 92 of the device 80, and the flow generator vanes 72 being adjacent and in fluid communication with passageways 93 and 94.

Figure 22:
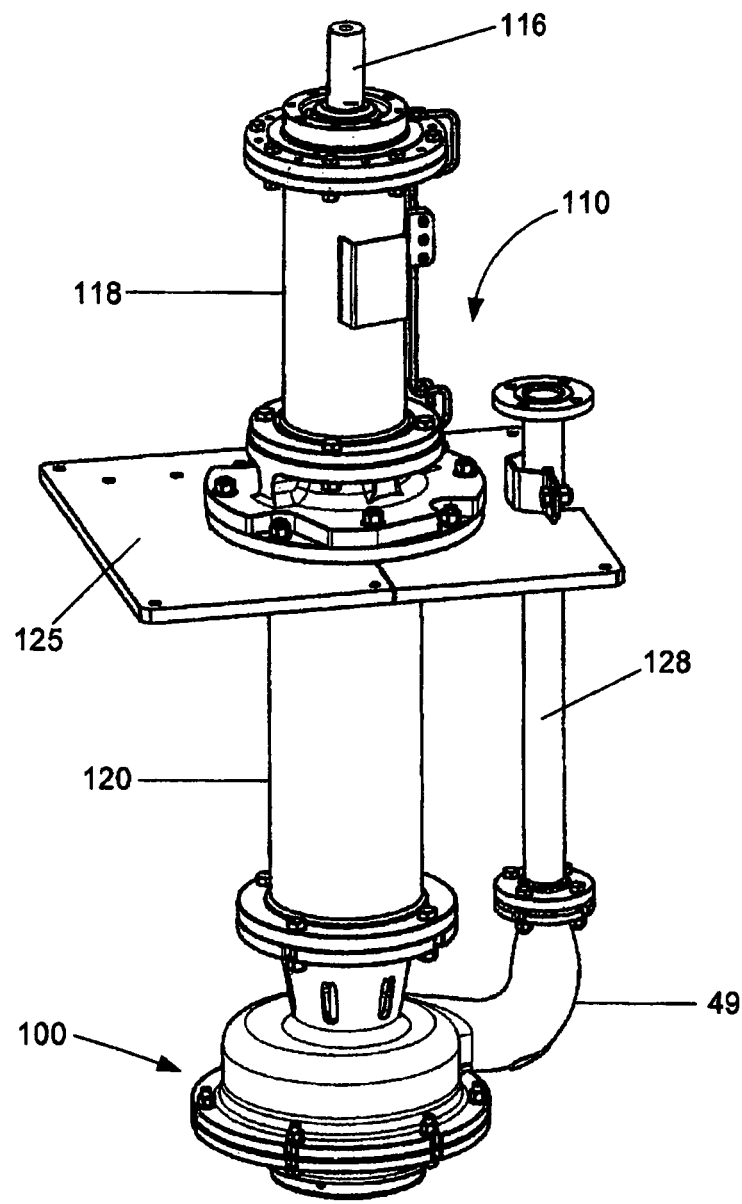
FIG. 22 is a perspective view of a sub-assembly of the pump apparatus according to the present invention.

Referring to FIG. 22 a pump sub-assembly 110 is shown including a pump 100 as herein described with reference to FIGS. 2 to 21. The pump sub-assembly 110 includes a mounting plate 125 which is secured to a floor below which the sump is located. When installed the pump apparatus 100 is arranged in a generally upright orientation as shown in the drawings, with the flow directing device 80 being disposed close to the bottom of the sump. A drive shaft 116 is operatively connected to the pump impeller 50 and is supported by a bearing assembly 118. A column 120 surrounds the drive shaft 116 and an extension pipe 128 extends from the discharge pipe 49 of the pump casing 30.

Figure 23:
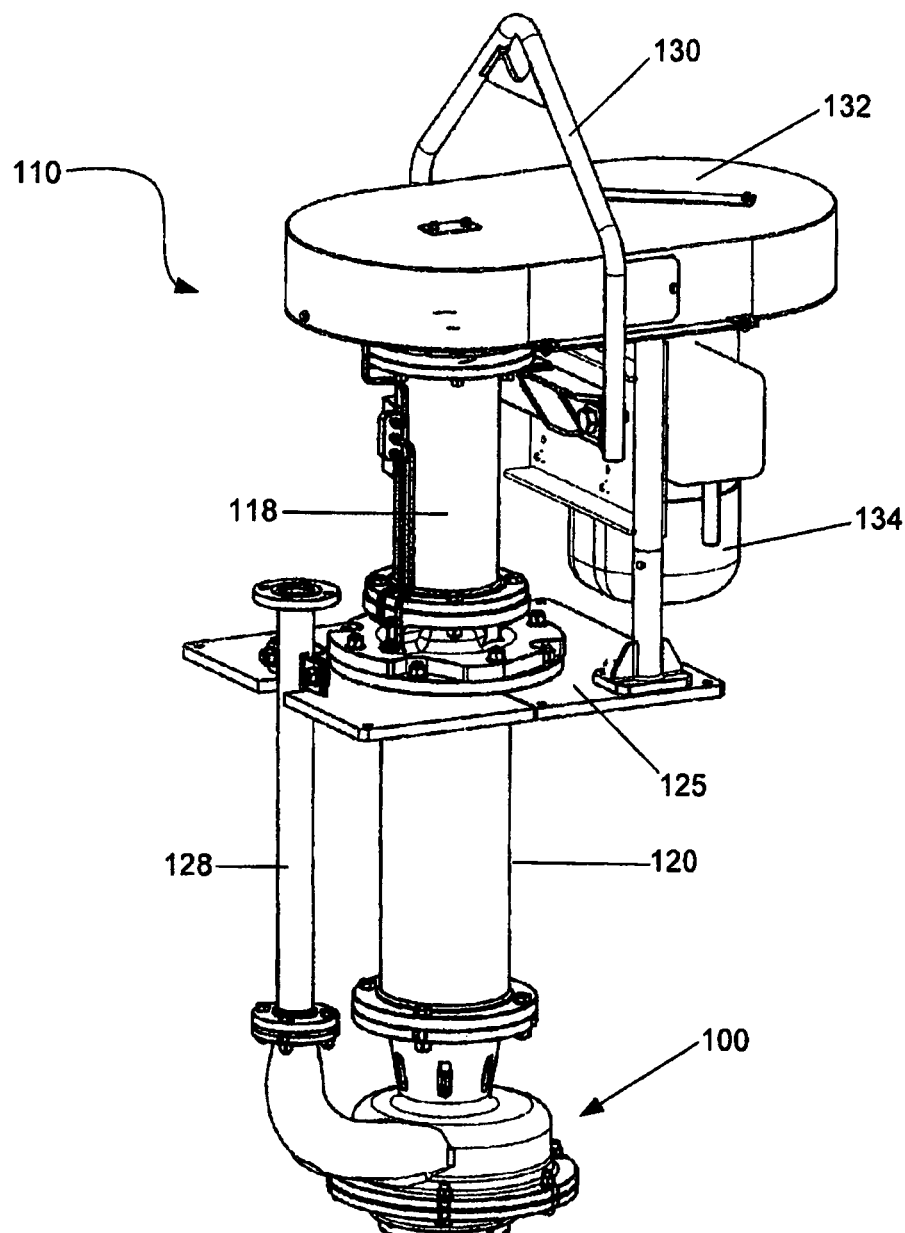
FIG. 23 is a perspective view of the sub-assembly of the pump apparatus shown in FIG. 22 but now including the drive motor.

As shown in FIG. 23 a vertically-mounted motor 134 is provided to drive the pump drive shaft 116. The motor shaft (not shown) is operatively connected to pump drive shaft 116 by a vee-belt transmission. The motor drive shaft is arranged for adjustable pivotal movement relative to the pump drive shaft 116 so that the distance between the two shafts can be adjusted thereby providing for correct tensioning or re-tensioning of the belt. This can be effected by a one point adjustment screw which can be adjusted by a hand tool. A cover 132 overlies the transmission and can be readily removed to provide access to the transmission in order to adjust the belt tension, for example. A lifting frame 130 can be used to lift the apparatus by way of any suitable lifting device.

The operation of the pump apparatus will hereinafter be described. The pump sub-assembly 110 and motor 134 is installed in an upright orientation with the column 120 and pump assembly 100 extending into the sump and arranged so that the flow directing device 80 is adjacent the bottom of the sump where particulate matter tends to settle and build up.

Actuation of the motor 134 causes rotation of pump drive shaft 116 and the impeller 50 associated therewith. When the impeller 50 is rotating, the inducer vanes 73 cause flow currents which stir up the particulate matter on the bottom of the sump. In addition the flow generator vanes 72 cause a circulating flow stream through the passages 93, 94 in the flow directing device 80 which add to the disturbance of the particulate matter and cause general mixing and agitation. As a result of this action, the disturbed particulate matter will be pumped by passing through the pump casing 30 and out through the outlet pipe bend 49. The passages in the flow directing device 80 limit the size of the particulate matter which can pass through the pump.

When the impeller 50 becomes worn, for example, the flow directing device 80 can be removed and the impeller replaced with a new one before the (or another) flow directing device 80 is refitted to the pump casing 30.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "above" and "below" and the like are used as words of convenience to provide reference points and are not to be construed as limiting terms.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Finally, it is to be understood that various alterations, modifications and/or additions may be incorporated into the various constructions and arrangements of parts without departing from the spirit or ambit of the invention.

The claims defining the invention are as follows:
1. A pump assembly including:
   a pump impeller comprising:
      a back shroud extending from the hub, the back shroud having an outer surface and an inner surface;
      a front shroud having an outer surface and an inner surface;
      a plurality of pumping vanes extending between the respective inner surfaces of the shrouds,
      an impeller inlet opening in the front shroud coaxial with the rotation axis of the impeller;
      one or more flow generating elements which extend from the outer surface of the front shroud in the region of the impeller inlet opening; and
      a plurality of flow inducer elements, each inducer element being in the form of a vane extending from the inner surface of the front shroud and each vane having a free edge portion which is spaced from the central rotation axis;

a flow directing device for directing material in relation to the adjacent moving impeller, the device including a main body having an inner side and an outer side, a plurality of passageways extending between the inner side and the outer side of the main body, at least one passageway providing for the in-use delivery of material to an opening of the impeller and at least one other passageway providing for the in-use circulation of a flow of material past the impeller; and a pump casing comprising:
  a main body section having a pumping chamber therein, and a discharge outlet extending from the pumping chamber;
  a strainer section having an intake region therein, with one or more inlets located at the intake region; and
  a feed opening between the intake region and the pumping chamber;
  wherein a plurality of flow distribution vanes are positioned in the region of the feed opening; and
wherein said impeller is mounted for rotation within said pumping chamber of said main body section of said pump casing, said flow directing device being operatively secured to said pump casing.

2. The pump assembly according to claim 1 wherein, for a plurality of said one or more inlets, said plurality of flow distribution vanes extend from the inlets and are arranged in spaced-apart relation.

3. The pump assembly according to claim 1 wherein said main body section includes a back wall and a peripheral side wall depending from said back wall, wherein the intake region extends from said back wall in a direction opposite to the peripheral side wall.

4. The pump assembly according to claim 1 wherein said intake region includes a generally frusto-conical inner side surface, said one or more inlets being disposed in spaced apart relation around said frusto-conical inner side surface.

5. The pump assembly according to claim 1 wherein said intake region includes a generally frusto-conical inner side surface, and the intake region further includes a frusto-conical inner side surface and the one or more inlets are elongate holes or slots arranged in the frusto-conical inner side surface of the intake region.

6. The pump assembly according to claim 1, wherein said pumping chamber is generally volute in configuration.

7. A method of assembling a pump assembly according to claim 1, the method including mounting the impeller within the pumping chamber and operatively securing the flow directing device to the pump casing.

8. A pump impeller having a rotational axis and including:
a hub;
a back shroud extending from the hub, the back shroud having an outer surface and an inner surface;
a front shroud having an outer surface and an inner surface, and having an inner edge;
a plurality of pumping vanes extending between the respective inner surfaces of the shrouds, each pumping vane of said plurality of pumping vanes having an inner edge,
an impeller inlet opening in the front shroud coaxial with the rotation axis of the impeller, and being located at the inner edge of the front shroud;
a flow intake region which is located between the inner edge of the front shroud and the inner edge of the pumping vanes of said plurality of pumping vanes;
one or more flow generating vanes arranged in spaced apart fashion and which extend from the outer surface of the front shroud in the region of the impeller inlet opening; and
a plurality of flow inducer elements located within the flow intake region, each flow inducer element being in the form of a vane extending from the inner surface of the front shroud towards the rotation axis of the impeller and which is positioned adjacent and arranged circumferentially about the impeller inlet opening in the flow intake region, each flow inducer element having a free edge portion which is spaced from the central rotation axis and being configured to create a swirling flow which extends outwardly and away from the impeller inlet opening.

9. The pump impeller according to claim 8 wherein the front shroud includes an annular wall portion and a projecting wall portion depending therefrom, the projecting wall portion being arranged to extend away from the plurality of pumping vanes to terminate at the inner edge of the front shroud, the impeller inlet opening, in the region of the inner edge of the front shroud, being arranged so as to define the flow intake region.

10. The pump impeller according to claim 9 wherein the projecting wall portion tapers inwardly from the annular wall portion when moving in a direction towards the inner edge of the front shroud.

11. The pump impeller according to claim 10 wherein the projecting wall portion is curved.

12. The pump impeller according to claim 9 wherein the flow inducer vanes are on the inner surface of the projecting wall portion adjacent the inner edge of the front shroud.

13. The pump impeller according to claim 9 wherein the one or more flow generating elements that are in the form of vanes are positioned on the outer surface of the projecting wall portion adjacent the inner edge of the front shroud.

14. The pump impeller according to claim 8 further comprising a group of pumping vanes on the outer surface of the back shroud arranged in spaced relation from one another.

15. The pump impeller according to claim 14 wherein each pumping vane of said group of pumping vanes is curved with one end adjacent an outer peripheral edge of the back shroud and extending inwardly therefrom towards the hub.

16. The pump impeller according to claim 8 wherein each of the flow inducer vanes is generally of an aerofoil shape.

17. The pump impeller according to claim 8 wherein the one or more flow generating vanes are generally of an aerofoil shape.

18. The pump impeller according to claim 8 wherein each flow inducer element of the plurality of flow inducer elements extends towards the rotation axis to a point about half the radius of the impeller inlet opening.

19. The pump impeller according to claim 8 wherein the flow inducer elements are positioned diametrically opposite one another.

20. A flow directing device for directing material in relation to an adjacent moving impeller, the flow directing device comprising a main body having an inner side and an outer side and having a chamber, positioned between the inner side and outer side, which is structured to receive an impeller therein, a peripheral side wall section and a plurality of concentrically arranged ring shaped elements operatively connected together and operatively connected to the peripheral side wall section, thereby defining annular spaces between the plurality of ring shaped elements which provide a plurality of passageways that extend between the inner side and the outer side of the main body including a first delivery passageway and a second delivery passageway positioned to deliver material to an opening of the impeller when positioned in the chamber, and further including a first flow circulating passageway and a second flow circulating passageway positioned to provide circulation of a flow of material between the inner side and outer side of the main body and past an impeller when positioned in the chamber.

21. The flow directing device according to claim 20 wherein one of said plurality of ring shaped elements includes a skirt portion at the outer side of the main body which provides for a partial barrier between an arrangement of the first delivery passageway and second delivery passageway and an arrangement of the first flow circulating passageway and second flow circulating passageway.

\* \* \* \* \*